(12) United States Patent
Thomas

(10) Patent No.: US 7,073,991 B2
(45) Date of Patent: Jul. 11, 2006

(54) DOOR LOCK SET INSTALLATION JIG

(75) Inventor: Rickey J Thomas, Lineboro, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/059,548

(22) Filed: Feb. 16, 2005

(65) Prior Publication Data

US 2005/0220549 A1 Oct. 6, 2005

Related U.S. Application Data

(63) Continuation-in-part of application No. 10/873,821, filed on Jun. 22, 2004.

(60) Provisional application No. 60/559,341, filed on Apr. 2, 2004.

(51) Int. Cl.
B23B 47/28 (2006.01)

(52) U.S. Cl. .................. 408/115 R; 408/103

(58) Field of Classification Search ............. 408/72 R, 408/72 B, 97, 103, 108, 115 R, 115 B, 241 B
See application file for complete search history.

(56) References Cited

U.S. PATENT DOCUMENTS

| | | | |
|---|---|---|---|
| 2,033,072 A * | 3/1936 | Harp | ........................ 408/97 |
| 2,268,930 A | 1/1942 | Edwards | |
| 3,327,573 A | 6/1967 | Prussiano | |
| 4,093,394 A * | 6/1978 | Adams | ........................ 408/103 |
| 4,594,032 A * | 6/1986 | Warburg | ................... 408/115 R |
| 4,715,125 A | 12/1987 | Livick | |
| 4,813,826 A | 3/1989 | Riedel | |
| 4,815,215 A | 3/1989 | Saylor et al. | |
| 5,146,961 A * | 9/1992 | Schoeller | ..................... 144/3.1 |
| 5,222,845 A | 6/1993 | Goldstein et al. | |
| 5,569,001 A * | 10/1996 | Brutscher et al. | ........ 408/115 R |
| 6,193,449 B1 | 2/2001 | Diaz | |
| 6,254,320 B1 | 7/2001 | Weinstein et al. | |
| 6,343,632 B1 | 2/2002 | Zivojinovic | |
| 6,390,738 B1 * | 5/2002 | Fridman | ..................... 408/103 |
| 6,398,465 B1 | 6/2002 | Monge | |
| 6,910,837 B1 * | 6/2005 | Trettin et al. | ............ 408/115 B |
| 2004/0240950 A1 * | 12/2004 | Trettin et al. | ............ 408/115 R |

FOREIGN PATENT DOCUMENTS

CA 2 438 416 2/2004

* cited by examiner

*Primary Examiner*—Daniel W. Howell
(74) *Attorney, Agent, or Firm*—Harness, Dickey & Pierce, P.L.C.

(57) ABSTRACT

An installation jig has a body member and a clamping mechanism. The clamping mechanism along with the body are clamped onto a door. The body includes a plurality of walls with one wall having an aperture enabling passage of a tool which may drill a hole into a door at a desired standard lock set size. Also, the body includes an aperture to enable a lock bolt hole to be drilled into the door at a plurality of standard door thickness.

19 Claims, 4 Drawing Sheets

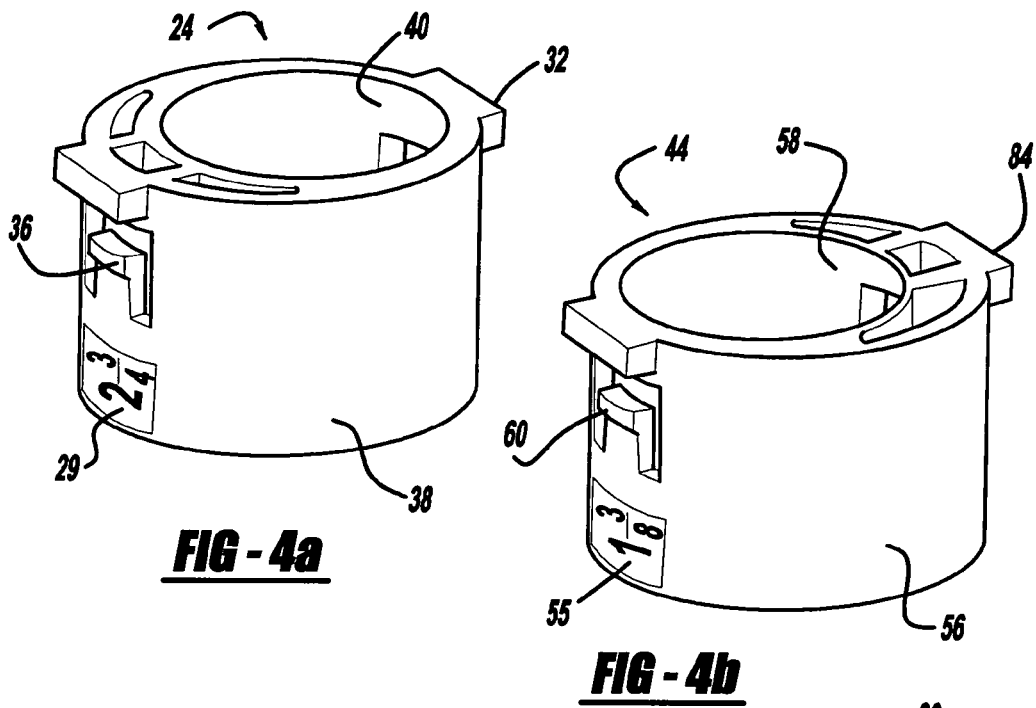
FIG - 4a
FIG - 4b
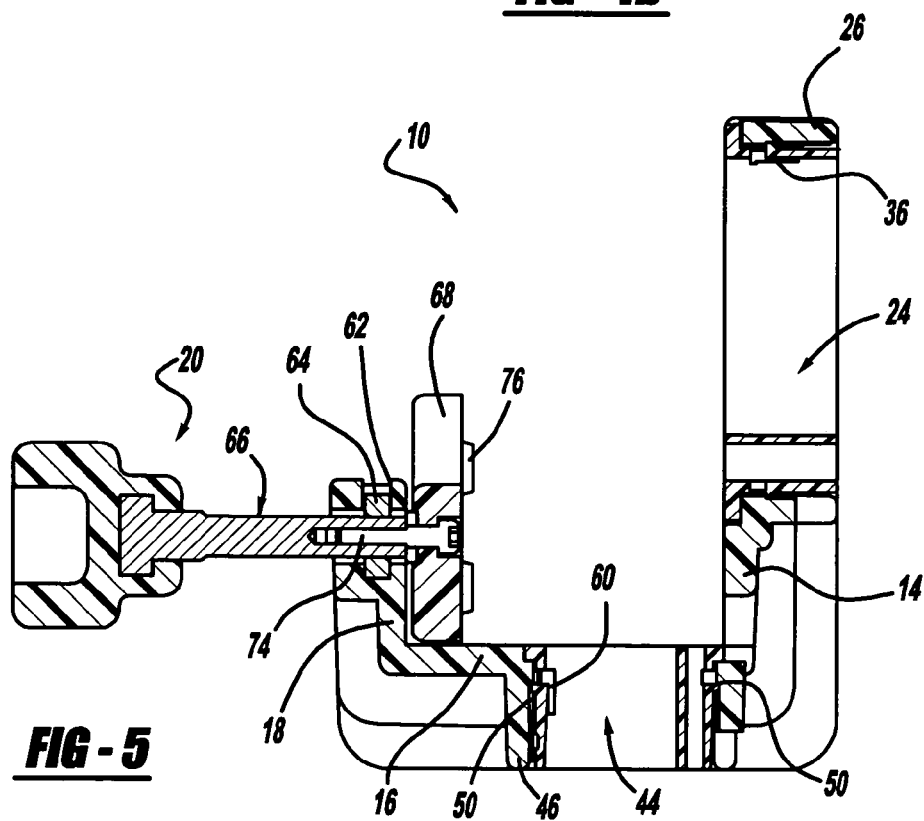
FIG - 5

DOOR LOCK SET INSTALLATION JIG

CROSS-REFERENCE TO RELATED APPLICATION

This application is a continuation-in-part of U.S. patent application Ser. No. 10/873,821, filed Jun. 22, 2004, which application claims the benefit of U.S. Provisional Application No. 60/559,341, filed on Apr. 2, 2004. The disclosures of these above applications are incorporated herein by reference.

FIELD OF THE INVENTION

The present invention relates to lock set installation and, more particularly, to an apparatus or jig to provide proper alignment to bore holes into a door to install a lock set assembly.

Installation jigs to install lock sets are known in the art. Examples of such jigs are illustrated in U.S. Pat. No. 6,398,465 to Monge and U.S. Pat. No. 2,763,299 to Cerf. The Monge patent illustrates an installation jig which includes a pair of jaws and a latch guide coupled together by an adjusting mechanism. The latch guide is somewhat complicated, however, it appears to work satisfactory for its intended purpose. The patent to Cerf illustrates a lock installation tool which only provides for a single back set. While these patents provide satisfactory apparatus, designers are always striving to improve the art.

The present invention provides the art with a simple lock set installation jig which is easily adjustable to fit onto a door. The jig enables receipt of both standard types of lock sets. The invention has a clamping mechanism to tighten the apparatus onto a door. The apparatus enables proper positioning of the bolt hole onto the thickness of the door.

According to the first aspect of the invention, a door lock set installation jig comprises a body member having a first wall with a first bore and a second wall with a second bore. The second wall is substantially perpendicular to the first wall. A first sleeve is positionable in the first bore. The sleeve includes an offset bore. The sleeve is multi-positional in said first bore to enable a hole to be drilled in a door which corresponds to various lock set sizes. The second sleeve is positionable in the second bore. The second sleeve includes an offset bore. The second sleeve is multi-positionable in the second bore to enable holes to be drilled in doors which correspond to various door thickness. A mechanism is included to secure the body to a door. The first sleeve has a mechanism to retain the sleeve in the bore. The first wall includes a first boss having the first bore. The boss includes a window. The first sleeve includes indicia which is positioned in the first boss window to indicate the door lock set size. The second sleeve has a mechanism to retain the second sleeve in the second bore. The second wall includes a second boss having the second bore. The second bore includes a window. The second sleeve includes indicia which is positioned in the second boss window to indicate the door lock set size. The body includes an alignment window to enable proper positioning of the body on a door. The securement mechanism includes a third wall on the body substantially parallel to the first wall. A force supplying member is coupled with the third wall to secure the body on the door.

According to a second aspect of the invention, a door lock set installation jig comprises a U-shaped body member with a first wall being one leg of the U, a second wall being the web of the U and a third wall being the other leg of the U. The third wall is shorter than the first wall. A first sleeve is positionable in the first bore. The first sleeve includes an offset bore. The sleeve is multi-positionable in the first bore to enable the hole to be drilled in the door which correspond to various lock sets. The second sleeve is positionable in the second bore. The second sleeve includes an offset bore. The second sleeve is multi-positionable in a second bore to enable an hole to be drilled in the door which corresponds to various door thickness. The clamping member is coupled with the third wall. The clamping member applies a force onto the door to secure the body member onto the door. The clamping member includes an abutment member with a threaded bolt which extends from the abutment member. The threaded bolt is received in a threaded bore in the third wall. The first sleeve has a mechanism to retain the sleeve in the bore. The first wall includes a first boss that includes the first bore. The boss includes a window. The first sleeve includes indicia which is positioned in the first boss window to indicate the door lock set size. The second sleeve has a mechanism to retain the second sleeve in the second bore. The second wall includes a second boss which includes the second bore. The second bore includes a window. The second sleeve includes indicia which is positioned in the second boss window to indicate the door lock set size. The body includes an alignment window to enable proper positioning of the body on a door.

From the following detailed description taken in conjunction with the drawings and subjoined claims, other objects and advantages of the present invention will become apparent to those skilled in the art.

BRIEF DESCRIPTION OF THE DRAWINGS

FIG. 3 is a side plan view of FIG. 1.

FIG. 4a and 4b are perspective views of the first and second sleeve.

FIG. 5 is a cross-section view of the installation jig of FIG. 1 along line 5—5 thereof.

DETAILED DESCRIPTION OF THE PREFERRED EMBODIMENTS

Figure 1:
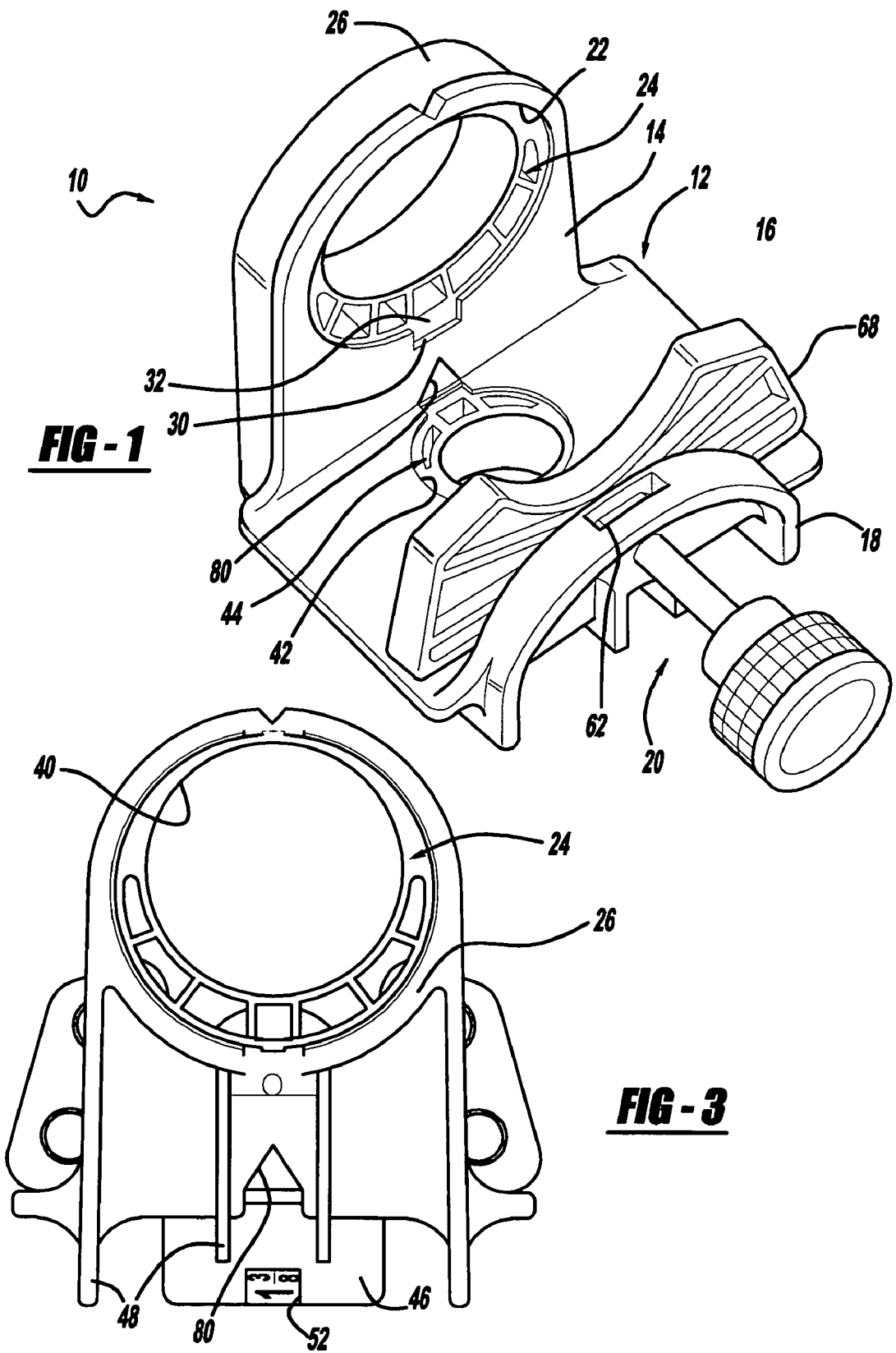
FIG. 1 is a perspective view of a lock set installation jig in accordance with a first embodiment of the present invention.

Turning to the figures, an installation jig is shown and designated with the reference numeral 10. The jig 10 includes a body 12 having an overall U-shape with one leg shorter than the other. Wall 14 is a leg of the U while wall 16 is the web of the U and wall 18 is a leg of the U which is shorter than leg 14. The body 12 may be molded from a plastic material or cast from a metallic material. A clamping mechanism 20 is coupled with the wall 18.

The first wall 14 includes an aperture 22 to receive a sleeve 24. The aperture 22 is defined within a boss 26 which extends from the wall 14. At least one, preferably a plurality of retention recesses 28 are on the boss 22 to retain the sleeve 24 within the aperture 22. The recesses 28 may have the same or different sizes to enable proper positioning of the sleeve 24 into the aperture 22. A cut out 30 receives a tab 32 on the sleeve 24 to prevent the sleeve 24 from passing through the aperture 22. The wall 14 includes a plurality of ribs 48 which provide structural reinforcement for the wall 14. Also, the boss 26 includes a window 34 to enable the indicia on the sleeve 29 to be placed within the window 34 to identify one of two positions which the sleeve 24 may be positioned. The sleeve 24 position corresponds to the standard two and three-eights inch or two and three-quarter inch door lock sets.

The sleeve 24 has a cylindrical body 38 with at least one, and preferably a plurality of pawls 36 matching the number of recesses 28 in the boss 26. The pawls 36 fit into the recesses 28 to retain the sleeve 24 in the aperture 22. The cylindrical body 38 includes an aperture 40 which is offset with respect to the cylindrical body 38. The offset of the aperture 40 enables the sleeve 24 to be removed from the aperture 22 and moved into a second position to provide the two different positions for the two standard lock sets.

Figure 2:
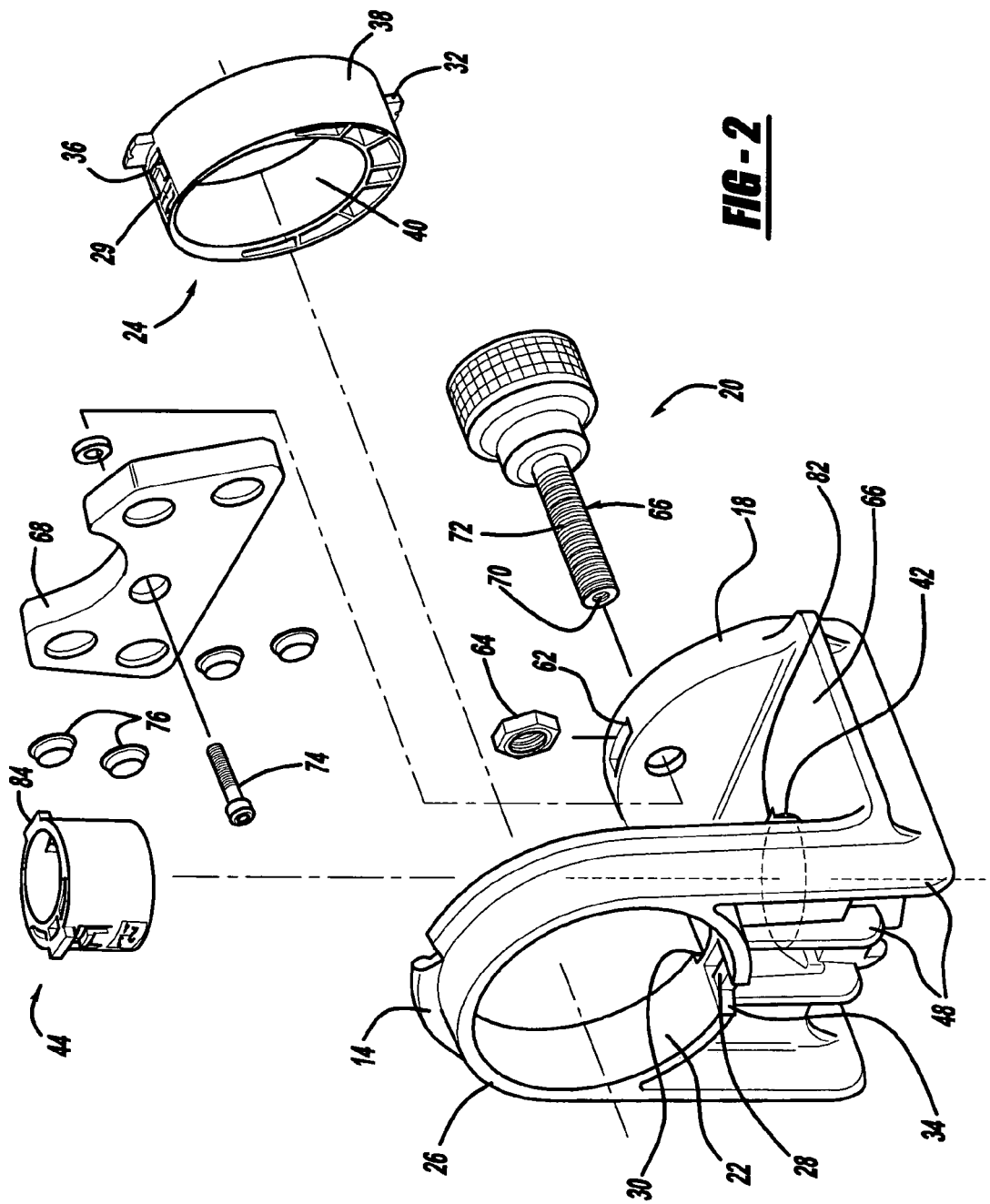
FIG. 2 is a perspective exploded view of a lock set installation jig in accordance with a first embodiment of the present invention.
Figure 6:
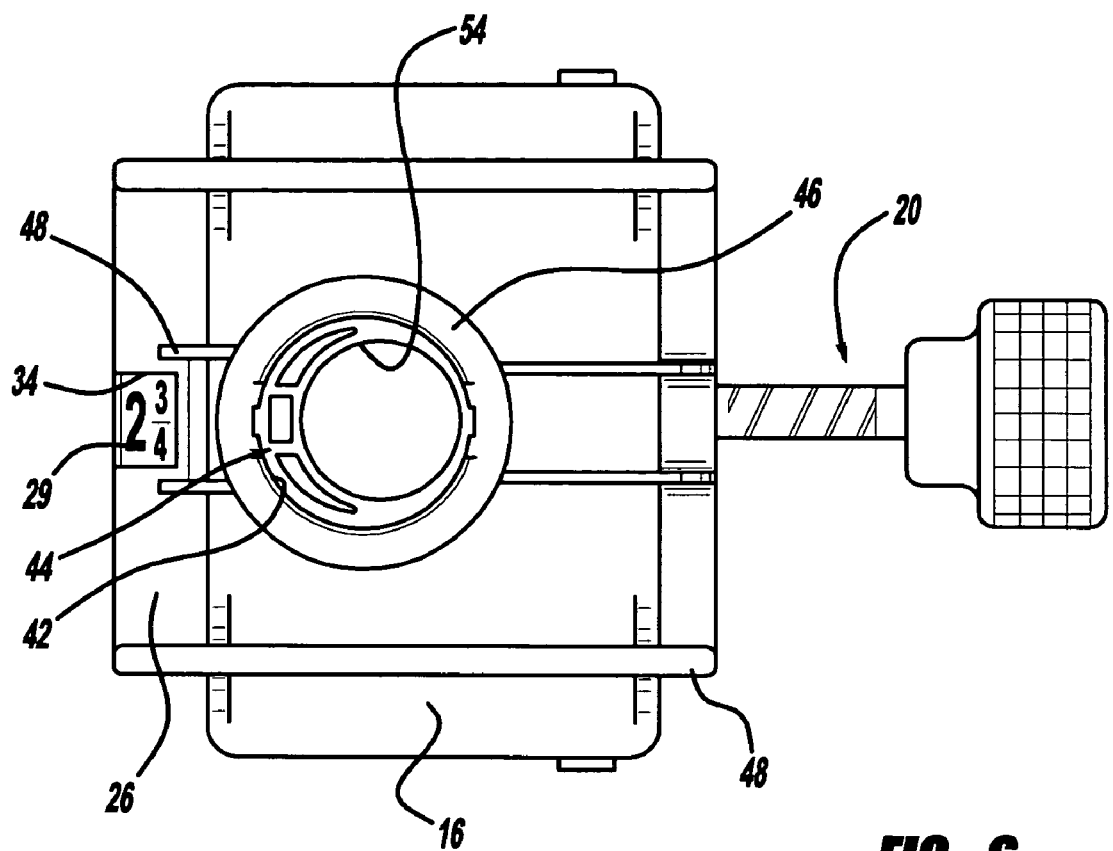
FIG. 6 is a side plan view of the installation jig of FIG. 6.

The second wall 16 is contiguous with the first wall 14 and is also perpendicular to it. An alignment window 80, to ensure proper alignment on the door, is at the intersection of the two walls 14 and 16. The second wall 16 includes an aperture 42 to receive a sleeve 44. Also, the wall 16 includes a boss 46 which defines the aperture 42. A cutout 82 on the wall 16 adjacent the aperture 42, receives a tab 84 from th sleeve 44 to prohibit the sleeve from passing through the aperture 42. The ribs 48 are continuous around the second wall 16, as seen in FIGS. 2 and 6. The boss 46 includes recesses 50 to position the sleeve 44 in the aperture 42. The boss 46 includes a window 52 to enable indicia on the sleeve 44 to identify to the user the door thickness which, in turn, positions the sleeve aperture 54 so that the to be drilled bolt hole is centered on the door thickness.

The sleeve 44 includes a cylindrical body 56 which includes an offset aperture 58. The body 56 includes at least one, and preferably a plurality of pawls 60 on its outer circumferential surface. The pawls 60 engage the recesses 50 in the boss 46 to retain and position the sleeve 44 within the aperture 42. The sleeve 44 includes indicia 55 which projects through window 52 to enable proper alignment of the sleeve 44 for the desired door thickness. Accordingly, the sleeve 44 can be removed from the aperture 42 and moved to provide the desired lock bolt hole position.

The third wall 18 includes a cut-out 62 which receives a threaded nut 64. The threaded nut 64 receives a threaded thumb screw 66 of the clamping mechanism 20.

The clamping mechanism 20, along with the thumb screw 66, includes a block member 68. The block member 68 is secured to the thumb screw 66 via a threaded bore 70 in the shaft 72 and a threaded fastener 74 in the bore 70. Thus, as the thumb screw 66 is rotated, the block member 68 moves toward or away from the wall 14. Thus, a door is clamped between the block member 68 and the wall 14.

The block member 68 may include nibs or tabs 76 manufactured from a resilient elastomeric material to provide a mark free securement with the door.

The present invention provides a jig which can be positively positioned onto a door. The jig includes a clamping mechanism to secure the jig to the door. Also, an alignment window enables proper positioning on the door.

In light of the above detailed description, those skilled in the art will appreciate that variations, modifications or alteration may occur without deviating from the scope and spirit of the present invention.

What is claimed is:

1. A door locket set installation jig comprising:
    a body member having a first wall with a first bore and a second wall with a second bore, said second wall being substantially perpendicular to said first wall;
    a first sleeve positionable in said first bore, said first sleeve having a mechanism for retaining said sleeve in said bore, and said sleeve including an offset bore, said sleeving being multi-positionable in said first bore for enabling holes to be drilled in doors which correspond to various lock set sizes;
    a second sleeve positionable in said second bore, said sleeve including an offset bore and said second sleeve being multi-positionable in said second bore for enabling holes to be drilled in doors which correspond to various door thickness; and
    a mechanism for securing said body member to a door.

2. The door lock set jig of claim 1 wherein said first sleeve has a mechanism for retaining said sleeve in said bore.

3. The door lock set jig of claim 1, wherein said first wall includes a first boss having said first bore and said boss having a window.

4. The door lock set jig of claim 3, wherein said first sleeve includes indicia which is positioned in said first boss window indicating the door lock set size.

5. The door lock set jig of claim 1 wherein said second sleeve has a mechanism for retaining said sleeve in said bore.

6. The door lock set jig of claim 1, wherein said second wall includes a first boss having said second bore and said boss having a window.

7. The door lock set jig of claim 3, wherein said second sleeve includes indicia which is positioned in said second boss window indicating the door lock set size.

8. The door lock set jig of claim 1, wherein an alignment window is on said body for enabling proper position of said body on a door.

9. The door lock set jig of claim 1, wherein said securement mechanism includes a third wall on said body substantially parallel to said first wall and a force applying member coupled with said third wall for securing said body on a door.

10. A door lock set installation jig comprising:
    an U-shaped body member with a first wall, being one leg of the U, a second wall, being the web of the U, and a third wall, being the other leg of the U, with the third wall being shorter than the first wall, said first and second walls including a bore;
    a first sleeve positionable in said first bore, said first sleeve having a mechanism for retaining said sleeve in said bore, and said sleeve including an offset bore, said sleeve being multi-positionable in said first bore for enabling holes to be drilled in doors which correspond to various lock set sizes;
    a second sleeve positionable in said second bore, said sleeve including an offset bore and said second sleeve being multi-positionable in said second bore for enabling holes to be drilled in doors which correspond to various door thickness; and
    a clamping member coupled with said third wall, said clamping member applying a force onto the door for securing said body member onto the door.

11. The door lock set installation jig of claim 10, wherein said clamping member includes an abutment member with a threaded bolt extending from said abutment members, said threaded bolt received in a threaded bore in said third wall.

12. The door lock set jig of claim 10, wherein said first sleeve has a mechanism for retaining said sleeve in said bore.

13. The door lock set jig of claim 10, wherein said first wall includes a first boss having said first bore and said boss having a window.

14. The door lock set jig of claim 12, wherein said first sleeve includes indicia which is positioned in said first boss window indicating the door lock set size.

15. The door lock set jig of claim 10 wherein said second sleeve has a mechanism for retaining said sleeve in said bore.

16. The door lock set jig of claim 10, wherein said second wall includes a first boss having said second bore and said boss having a window.

17. The door lock set jig of claim 12, wherein said second sleeve includes indicia which is positioned in said second boss window indicating the door lock set size.

18. The door lock set jig of claim 10, wherein an alignment window is on said body for enabling proper position of said body on a door.

19. The door lock set jig of claim 10, wherein said securement mechanism includes a third wall on said body substantially parallel to said first wall and a force applying member coupled with said third wall for securing said body on a door.

* * * * *